United States Patent
Abe

(10) Patent No.: US 10,259,989 B2
(45) Date of Patent: Apr. 16, 2019

(54) WELL-TREATMENT FLUID, METHOD FOR FORMING FRACTURE, AND METHOD FOR ISOLATING WELLBORE

(71) Applicant: Kureha Corporation, Tokyo (JP)

(72) Inventor: Shunsuke Abe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/976,962

(22) Filed: May 11, 2018

(65) Prior Publication Data
US 2018/0355239 A1   Dec. 13, 2018

(30) Foreign Application Priority Data

Jun. 7, 2017   (JP) .................. 2017-112932

(51) Int. Cl.
| | | |
|---|---|---|
| C09K 8/68 | (2006.01) | |
| C08G 69/36 | (2006.01) | |
| E21B 41/02 | (2006.01) | |
| C09K 8/508 | (2006.01) | |
| E21B 43/26 | (2006.01) | |
| C08G 69/40 | (2006.01) | |

(52) U.S. Cl.
CPC .............. C09K 8/68 (2013.01); C08G 69/36 (2013.01); C08G 69/40 (2013.01); C09K 8/5086 (2013.01); E21B 41/02 (2013.01); E21B 43/26 (2013.01)

(58) Field of Classification Search
CPC ................................ C07C 237/22; C09K 8/68
See application file for complete search history.

(56) References Cited

U.S. PATENT DOCUMENTS

| | | | | |
|---|---|---|---|---|
| 5,373,086 A | * | 12/1994 | Koskan | ............... C02F 5/12 525/419 |
| 8,333,242 B2 | | 12/2012 | Gupta et al. | |
| 8,726,999 B2 | | 5/2014 | Gupta et al. | |
| 9,267,257 B2 | | 2/2016 | Zaitoun et al. | |
| 2006/0052577 A1 | * | 3/2006 | Swift | ............... C08G 63/668 528/328 |
| 2010/0081586 A1 | | 4/2010 | Smith et al. | |
| 2012/0264655 A1 | | 10/2012 | Fitch et al. | |
| 2013/0105154 A1 | * | 5/2013 | Vorderbruggen | ....... E21B 43/04 166/271 |
| 2013/0248186 A1 | * | 9/2013 | Koskan | ............... E21B 43/26 166/304 |
| 2017/0233640 A1 | * | 8/2017 | Chopade | ............... C09K 8/685 166/308.5 |

FOREIGN PATENT DOCUMENTS

| | | |
|---|---|---|
| EP | 0583814 A1 | 2/1994 |
| JP | H06206954 A | 7/1994 |
| JP | 2005344061 A | 12/2005 |

* cited by examiner

*Primary Examiner* — Angela M DiTrani Leff
*Assistant Examiner* — Avi T Skaist
(74) *Attorney, Agent, or Firm* — Birch, Stewart, Kolasch & Birch, LLP

(57) ABSTRACT

Provided is a well-treatment fluid that reduces a load on the environment.

A well-treatment fluid containing a non-ionic polyamino acid derivative including an α-type or β-type polyaspartic acid monomer unit represented by Formula (I) and an α-type or β-type polyaspartic acid monomer unit represented by Formula (II).

[Chemical Formula 1]

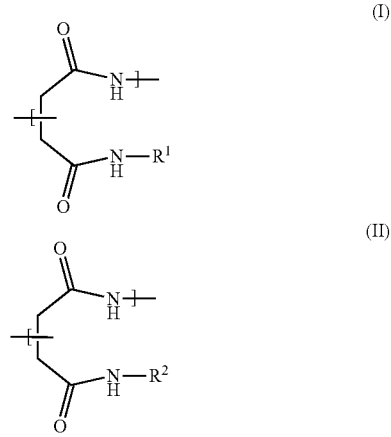

3 Claims, No Drawings

WELL-TREATMENT FLUID, METHOD FOR FORMING FRACTURE, AND METHOD FOR ISOLATING WELLBORE

CROSS-REFERENCE TO RELATED APPLICATIONS

This application claims the benefit of Japanese Patent Application No. 2017-112932 filed Jun. 7, 2017, the disclosure of which is herein incorporated by reference in its entirety.

TECHNICAL FIELD

The present invention relates to a well-treatment fluid used for producing hydrocarbon resources such as petroleum or natural gas and a well-treatment method using the well-treatment fluid.

BACKGROUND ART

Hydrocarbon resources such as petroleum or natural gas have been produced by drilling a well (an oil well or gas well, collectively called "a well") having a porous and permeable subterranean formation.

Among such hydrocarbon resources, shale oil and shale gas are petroleum and natural gas trapped in a shale formation located below 1000 to 2600 m underground. The shale oil and shale gas have been known to exist for a long time. However, the shale formed by compaction of fine particles exhibits poor fluid permeability and thus commercial production of shale oil and shale gas through a downhole have been considered difficult until recently.

However, in the 2000s, a horizontal drilling method (drilling method, in which a well is drilled horizontally along the shale formation to increase the contact area with gas), hydraulic fracturing (method, in which a fracturing fluid is introduced into a well at high pressure, crushing rocks by fluid pressure to form a fracture as a flow path of production fluid), and a seismic wave observation technique called micro seismic (technique of observing microearthquakes due to hydraulic fracturing to assess its performance and increase accuracy of the stimulation strategy) were established. Such techniques allow sufficient fluid permeability on the shale formation, and dramatically boost the production of shale oil and shale gas. Under circumstances where demands for energy are increasing worldwide, these oil and gas are expected as new energy and the market thereof has been rapidly growing.

Specifically, hydraulic fracturing, which is one of the well stimulation method is performed by the following processes such as: a perforation process in which, in a wellbore drilled in the vertical direction and/or the horizontal direction from the ground surface to the production reservoir (a subterranean formation, from which petroleum and the like are produced, for example, the shale formation, from which shale gas and the like are produced), the reservoir is perforated with a perforation gun; and a fracturing process in which a fracturing fluid containing proppants and the other chemicals is injected into the wellbore at high pressures to form and expand a fracture in the reservoir formation.

Additionally, after starting the production the reservoir may lose the fluid permeability due to the closure of the fracture with the passage of time, and stimulation of the productive layer is also performed to enhance the permeability again and to maintain efficient production rate. Stimulation of the reservoir is specifically performed by the following processes. That is, an isolation process of injecting a temporary diverting agent into a downhole, and temporarily plugging and isolating an existing fracture is performed. Then, as in a case of completing a new well, the perforation and a refracturing process are performed to form a new fracture. Thus, A successful refracturing operation restores well productivity to near original or even higher rates of production and extends the productive life of a well.

As the well-treatment fluid such as the fracturing fluid and the temporary diverting agent, various type of water-based, oil-based, and emulsion well-treatment fluids are used. Various chemicals such as proppants, viscosifying agents, acids for dissolving rocks and the like, and friction reducing agents are added to a solvent such as water.

However, in association with the recent growth of the market, environmental damage of chemicals added to the well-treatment fluid has being concerned. There is a movement to suspend the use of substances that may cause a large environmental damage and to switch to environmentally friendly alternatives.

For example, Patent Document 1 describes a thermothickening polymer used as a component for a fracturing fluid or the like. Patent Document 2 describes an example of using a polymer for a fracturing fluid, wherein the viscosity of the polymer increases in response to heat. Patent Document 3 describes using a thermothickening polymer as a fracturing fluid or a temporary diverting agent. Patent Document 4 describes using a thermothickening polymer having a cellulose chain to reduce unwanted water generation in a well and the like. Patent Documents 5 and 6 describe a fracturing fluid containing a surfactant and a thermothickening polymer. On the other hand, Patent Document 7 describes a non-ionic surfactant wherein aqueous solution viscosity of the non-ionic surfactant increases by heat, and also describes application to cosmetics and external use preparations.

CITATION LIST

Patent Literature

Patent Document 1: JP 06-206954 A
Patent Document 2: US 2010/0081586 A specification
Patent Document 3: US 2012/0264655 A specification
Patent Document 4: U.S. Pat. No. 9,267,257 B specification
Patent Document 5: U.S. Pat. No. 8,333,242 B specification
Patent Document 6: U.S. Pat. No. 8,726,999 B specification
Patent Document 7: JP 2005-344061 A

SUMMARY OF INVENTION

Technical Problem

An object of the present invention is to provide a well-treatment fluid that reduces environmental damage and a well-treatment method using such a well-treatment fluid.

Solution to Problem

As a result of diligent research to solve the above problems, the inventor of the present invention found that a well-treatment fluid containing a specific non-ionic polyamino acid derivative achieves the object described above, and thereby completed the present invention.

According to an embodiment of the present invention, a well-treatment fluid is provided. The well-treatment fluid includes:

a non-ionic polyamino acid derivative; the non-ionic polyamino acid derivative including:

an α-type or β-type polyaspartic acid monomer unit represented by Formula (I):

[Chemical Formula 1]

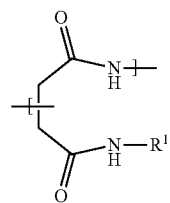

(I)

where R¹ is a hydrocarbon group having from 3 to 18 carbons; and an α-type or β-type polyaspartic acid monomer unit represented by Formula (II):

[Chemical Formula 2]

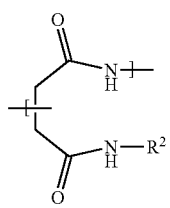

(II)

where R² is a group selected from the group consisting of a hydroxymethyl group, a hydroxyethyl group, a hydroxypropyl group, a hydroxybutyl group, a hydroxypentyl group, a hydroxyethoxyethyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, an N,N-dimethylaminopropyl group, and an N,N-diethylaminopropyl group.

Further, according to another embodiment of the present invention, a method for forming a fracture, the method including injecting the well-treatment fluid as a fracturing fluid into a wellbore and forming a fracture in a subterranean formation by hydraulic fracturing is provided.

Further, according to another embodiment of the present invention, a method for isolating a wellbore the method including injecting the well-treatment fluid as a temporary diverting agent into a wellbore is provided.

Advantageous Effects of Invention

According to an embodiment of the present invention, a well-treatment fluid that reduces environmental damage can be provided. According to an embodiment of the present invention, a method for forming a fracture and a method for isolating a wellbore, which can be efficiently performed, can be provided.

DESCRIPTION OF EMBODIMENTS

Well-Treatment Fluid

A well-treatment fluid according to one aspect of the present invention includes a fluid used in well-treatment for drilling and producing hydrocarbon resources such as petroleum (shale oil) and natural gas (shale gas) through a downhole. Specifically, the well-treatment fluid according to one aspect of the present invention includes a fracturing fluid used for forming a fracture in hydraulic fracturing, and a temporary diverting agent used for plugging and temporarily isolating an existing fracture before a refracturing process.

Specifically, the well-treatment fluid according to one aspect of the present invention is a solution in which a specific non-ionic polyamino acid derivative described later is dissolved in a solvent, and may further include various additives such as a proppant as necessary. Note that the well-treatment fluid may further contain a non-ionic polyamino acid derivative other than the specific non-ionic polyamino acid derivative described later. In the specification, "well-treatment fluid" specifically means a composition preferably used for well-treatment.

Non-Ionic Polyamino Acid Derivative

In an embodiment of the present invention, polyamino acid corresponds to a polyamide compound obtained by polymerization via amide bond formation between an amino group and a carboxyl group of amino acid.

Specifically, the well-treatment fluid according to one aspect of the present invention contains a non-ionic polyamino acid derivative obtained by copolymerization of an α-type or β-type polyaspartic acid monomer unit represented by Formula (I):

[Chemical Formula 3]

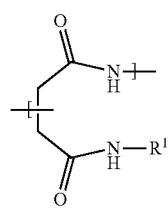

(I)

where R¹ is a hydrocarbon group having from 3 to 18 carbons, and an α-type or β-type polyaspartic acid monomer unit represented by Formula (II):

[Chemical Formula 4]

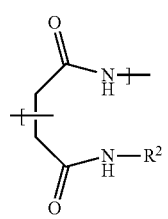

(II)

where R² is a group selected from the group consisting of a hydroxymethyl group, a hydroxyethyl group, a hydroxypropyl group, a hydroxybutyl group, a hydroxypentyl group, a hydroxyethoxyethyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, an N,N-dimethylaminopropyl group, and an N,N-diethylaminopropyl group. In this copolymer, the method for copolymerizing monomer units may be any of random copolymerization, block copolymerization, and graft copolymerization.

Also, the ratio of monomer unit of Formula (I) to monomer unit of Formula (II) in the polyamino acid derivative may be appropriately selected according to properties such as desired solubility. As the amount of monomer unit of Formula (I) in the polyamino acid derivative increases, the polyamino acid derivative becomes more hydrophobic. As the amount of the monomer unit of Formula (II) increases, the polyamino acid derivative becomes more hydrophilic and is readily dissolved in water.

In the above Formula (I), the hydrocarbon group having from 3 to 18 carbons of $R^1$ may be a saturated or unsaturated group. Specific examples of the hydrocarbon group include a straight-chain alkyl group such as a propyl group, a butyl group, a pentyl group, a hexyl group, an octyl group, a decyl group, a dodecyl group, a tetradecyl group, and an octadecyl group; a branched-chain alkyl group such as an isopropyl group, an isobutyl group, an isopentyl group, and an isohexyl group; a cycloalkyl group such as a cyclobutyl group, a cyclopentyl group, and a cyclohexyl group; a cycloalkyl alkyl group such as a cyclobutylmethyl group, a cyclopentylmethyl group, a cyclohexylmethyl group, a cyclobutylethyl group, a cyclopentylethyl group, a cyclohexylethyl group, a cyclobutyl propyl group, a cyclopentylpropyl group, a cyclohexylpropyl group, a cyclobutylbutyl group, a cyclopentylbutyl group, and a cyclohexylbutyl group; and an alkenyl group such as a propenyl group, a butenyl group, a pentenyl group, and a hexenyl group.

$R^1$ is preferably a group selected from the group consisting of a hexyl group, an octyl group, a decyl group, a dodecyl group, a tetradecyl group, an octadecyl group, and an isopropyl group.

In the above Formula (II), $R^2$ is a hydrocarbon group having a hydrophilic group. Specific examples include a group selected from the group consisting of a hydroxymethyl group, a hydroxyethyl group, a hydroxypropyl group, a hydroxybutyl group, a hydroxypentyl group, a hydroxyethoxyethyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, an N,N-dimethylaminopropyl group, and an N,N-diethylaminopropyl group.

In one aspect of the present invention, $R^1$ and $R^2$ in the monomer units of Formulae (I) and (II) constituting the non-ionic polyamino acid derivative may be constituted by a combination of different groups shown above.

The polyamino acid derivative according to an embodiment of the present invention may contain only one of an α-amide type monomer unit and a β-amide type monomer unit or both monomer units. In a case where the polyamino acid derivative contains both monomer units, the ratio of α-amide type monomer unit to β-amide type monomer unit is not particularly limited to a specific ratio.

Examples of the non-ionic polyamino acid derivative that is preferably used in one aspect of the present invention include a laurylamide aspartate-hydroxyethylamide copolymer, a laurylamide aspartate-hydroxypropylamide copolymer, a laurylamide aspartate-hydroxybutylamide copolymer, a laurylamide aspartate-methoxyethylamide copolymer, a laurylamide aspartate-methoxypropylamide copolymer, a laurylamide aspartate-hydroxyethoxyethylamide copolymer, a laurylamide aspartate-dimethylaminopropylamide copolymer, a laurylamide aspartate-diethylaminopropylamide copolymer, a decylamide aspartate-hydroxyethylamide copolymer, a decylamide aspartate-hydroxypropylamide copolymer, a decylamide aspartate-methoxyethylamide copolymer, a decylamide aspartate-hydroxyethoxyethylamide copolymer, a decylamide aspartate-dimethylaminopropylamide copolymer, a decylamide aspartate-diethylaminopropylamide copolymer, an octylamide aspartate-hydroxyethylamide copolymer, an octylamide aspartate-hydroxypropylamide copolymer, an octylamide aspartate-methoxyethylamide copolymer, an octylamide aspartate-hydroxyethoxyethylamide copolymer, an octylamide aspartate-dimethylaminopropylamide copolymer, and an octylamide aspartate-diethylaminopropylamide copolymer, but is not limited to these copolymers.

The polyamino acid derivative used in an embodiment of the present invention can be produced by using, for example, a poly succinimide as a raw material. The molecular weight of poly succinimide used as a raw material may be selected according to the molecular weight of desired polyamino acid derivative. In an embodiment of the present invention, the weight average molecular weight of poly succinimide is, for example, from approximately 2000 to 500000 as a value determined by gel permeation chromatography using polystyrene standard. The polyamino acid derivative may be produced from poly succinimide by the following process. For example, amines such as dodecyl amine and octadecyl amine are reacted with a poly succinimide dissolved in a solvent such as N,N-dimethylformamide, thereby adding amines to the poly succinimide via ring-opening of the imide ring. The obtained reaction mixture is charged into a poor solvent such as acetonitrile, thereby precipitating a target polyamino acid derivative.

The well-treatment fluid according to an embodiment of the present invention contains at least one type of non-ionic polyamino acid derivative described above.

Solvent

In one aspect of the present invention, a fluid which has been typically used, such as water or an emulsion of water and oil, can be employed as a fluid used for a solvent or a dispersion medium of the polyamino acid derivative and other additives. The fluid is not particularly limited as long as the fluid can exhibit a function corresponding to the type of well-treatment fluid by injecting the fluid into the downhole at high pressures (for example, in a case where the fluid is a fracturing fluid, the fluid can exhibit a function of forming a fracture in the reservoir formation) and can dissolve the non-ionic polyamino acid derivative. Water is not a hazardous or toxic material, offers ease of handling, does not cause unexpected reaction or action with proppants and the other chemicals included in the fluid, and is available at low cost. Thus, water or water based solvent such as brine is preferably used.

Additive

In one aspect of the present invention, the well-treatment fluid may further contain known additives in addition to the non-ionic polyamino acid derivative as necessary.

Examples of the known additives used for the well-treatment fluid include proppants, gelling agents, scale inhibitors, acids for dissolving rocks and the like, friction reducer, gel breakers, biocides, clay stabilizers, corrosion inhibitors, crosslinking agents, iron control agents, pH controlling agents, surfactants, and non-emulsifiers.

The proppant is not particularly limited. For example, in the case of a fracturing fluid, the proppant is not particularly limited, as long as a fracture formed by pressure of fluid injected at high pressures can be maintained against pressure of deep subterranean formation. Known materials that have been used for proppants consisting of inorganic or organic materials are used for the proppant. As the organic material, plastic beads such as a styrene-divinylbenzene copolymer, hulls or shells of nuts and the like can be used. As the inorganic material, metals, silica, alumina, and other inorganic particles can be used. Sand, gravel, glass beads, ceramics, bauxite, glass, and the like, or a combination thereof can be preferably used from the perspective of ease of transportation, handling, strength, and economical efficiency. As the proppant for the fracturing fluid, one type of proppant may be used, or two or more types of proppants having different materials, shapes, sizes, or the like may be used. The content of proppant in the well-treatment fluid is not particularly limited and, for example, from approximately 10 to 1000 g/L, preferably from 20 to 900 g/L, and more preferably from 30 to 800 g/L.

The gelling agent is a chemical added to efficiently transport the proppant, and examples thereof include guar gum, and a polysaccharide mixture. The gelling agent may further contain methanol or ethylene glycol as a stabilizer or a winterizing agent, using a petroleum distillate or a distillate of hydrorefined light oil as a carrier fluid.

The scale inhibitor is a chemical added to prevent precipitation or deposition of calcium carbonate, calcium sulfate and the like on steel pipes. Examples thereof include ethylene glycol, ammonium chloride, acrylamide-sodium acrylate copolymer, sodium polycarboxylate, and phosphate.

The acid for dissolving rocks and the like is a chemical added to dissolve or scouring a subterranean formation and includes hydrochloric acid, for example.

The friction reducer is a chemical added to reduce flow loss of fluid, and is, for example, polyacrylamide, petroleum distillate. The friction-reducing agent may further contain methanol or ethylene glycol as a stabilizer or a winterizing agent, using a distillate of hydrorefined light oil as a carrier fluid.

The gel breaker is a chemical added to reduce the viscosity of a fluid over time, and examples thereof include peroxydisulfate, ammonium persulfate, magnesium peroxide, and magnesium oxide. The gel breaker may further contain sodium chloride or calcium chloride as a stabilizer.

The biocide is a chemical added to kill bacteria and prevent their propagation, and examples thereof include glutaraldehyde, ammonium chloride (quaternary ammonium), and tetrakis-(hydroxymethyl)-phosphonium sulfate.

The clay stabilizer is a chemical added to prevent swelling of clay and infiltration into a subterranean formation, and examples thereof include salts such as choline chloride, tetramethylammonium chloride, and sodium chloride.

The corrosion inhibitor is a chemical added to prevent corrosion of steel pipes or various tools, and examples thereof include methanol, N,N-dimethylformamide, formic acid, and acetaldehyde. The anti-corrosive agent may further contain methanol or isopropanol as a stabilizer or a winterizing agent.

The crosslinking agent is a chemical added to efficiently transport the proppant, and examples thereof include borate, potassium hydroxide, potassium metaborate, triethanolamine zirconate, sodium tetraborate, boric acid, and zirconium complex. The crosslinking agent may further contain methanol or ethylene glycol as a stabilizer or a winterizing agent.

The iron control agent is a chemical added to prevent precipitation of metal oxides, and examples thereof include citric acid, acetic acid, thioglycolic acid, and sodium erythorbate.

The pH controlling agent is a chemical added to adjust the pH of a fluid, and examples thereof include sodium carbonate, potassium carbonate, sodium hydroxide, potassium hydroxide, and acetic acid.

The surfactant is a chemical added to reduce the surface tension of a fluid, and examples thereof include isopropanol and lauryl sulfate. The surfactant may further contain ethanol, methanol, or isopropanol as a stabilizer or a winterizing agent, or contain 2-butoxy ethanol as a stabilizer, using napthalene as a carrier fluid.

The non-emulsifier is a chemical added to prevent unnecessary emulsification in a downhole, and examples thereof include lauryl sulfate. The non-emulsifier may further contain isopropanol or ethylene glycol as a stabilizer or a winterizing agent.

The content of these additives in the well-treatment fluid is not particularly limited, and may be appropriately adjusted according to the downhole condition.

Well-Treatment Fluid

The well-treatment fluid according to one aspect of the present invention can be obtained by dissolving the non-ionic polyamino acid derivative described above in the solvent such as water described above at a given concentration, as necessary, together with the additives described above.

The non-ionic polyamino acid derivative described above is a temperature-responsive polymer derived from amino acid. When an aqueous solution containing the non-ionic polyamino acid derivative is heated above a predetermined gelling temperature, the viscosity of the aqueous solution rapidly increases due to sol-gel transition. When the aqueous solution is cooled to a temperature below the gelling temperature, the viscosity of the aqueous solution decreases. The gelling temperature and the viscosity behavior in association with temperature elevation may be adjusted by controlling the ratio of monomer unit content of Formula (I) to monomer unit content of Formula (II), the type of side chain, molecular weight (which can be adjusted by the molecular weight of raw material poly succinimide), the type of solvent, and the concentration of polyamino acid derivative.

The well-treatment fluid according to one aspect of the present invention contains the non-ionic polyamino acid derivative. Such a well-treatment fluid is a liquid or has a low viscosity at room temperature or on the ground surface, whereas, when being injected into the wellbore, the well-treatment fluid thickens by heating due to subterranean heat. Thus, the viscosity of well-treatment fluid can be adjusted to desired viscosity according to application of well-treatment when the well-treatment fluid reaches the production reservoir.

The well-treatment fluid according to one aspect of the present invention may not be viscous or a low viscosity in a stirring process of dispersing additives such as the proppant and the like in the fluid on the ground, and a process of injecting the fluid into the wellbore via a pump or the like. Such a feature enables excellent handling performance and various operation with a less load.

On the other hand, when the well-treatment fluid according to an embodiment of the present invention is used as a fracturing fluid, the well-treatment fluid according to an embodiment of the present invention may have a viscosity large enough to build a pressure to form a fracture to the reservoir formation, in fracturing operation. The viscosity of the well-treatment fluid can be appropriately adjusted according to the hardness of the formation rocks or reservoir temperature.

According to an embodiment of the present invention, in a case where the well-treatment fluid is used as a temporary diverting agent, the well-treatment fluid may have a viscosity sufficient to temporarily isolate a fracture by plugging an existing fracture in the post production reservoir. The viscosity of the well-treatment fluid can be appropriately adjusted according to the size of perforation hole or existing fracture and the reservoir temperature.

Further, in one aspect of the present invention, after the well-treatment fluid reaches the reservoir and thickens by elevating temperature, the well-treatment fluid can also be cooled by delivering a cooling fluid such as water to reduce the viscosity of the well-treatment fluid again and then facilitate flow back operation before starting production. Alternatively, the non-ionic polyamino acid derivative can be decomposed over time at a high-temperature due to subterranean heat and can be flowed back because of a low viscosity.

In association with the mechanism of action of the well-treatment fluid, the concentration of non-ionic polyamino acid derivative of the well-treatment fluid is not particularly limited. One skilled in the art may appropriately set the concentration so that the well-treatment fluid exhibits desired gelling temperature and viscosity behavior. For example, a solution may be prepared by dissolving a polyamino acid derivative to be used at a given concentration in a solvent such as water and adding other additives thereto as necessary. By using a rheometer, the viscosity of this solution at an arbitrary temperature can be determined, and thus the concentration of the polyamino acid derivative can be adjusted to achieve the desired gelling temperature and viscosity behavior. In particular, the polyamino acid derivative used in an embodiment of the present invention, which is derived from amino acid and has a less impact on the environment, can be added in a fluid even at high concentrations.

The polyamino acid derivative used in an embodiment of the present invention is non-ionic. Thus, even when electrolytes such as salts are added as other additives to the polyamino acid derivative, the polyamino acid derivative is not susceptible to the effect of these additives and can exhibit stable thickening action.

Method for Forming Fracture

In one aspect of the present invention, a method for forming a fracture, the method including a process of injecting the well-treatment fluid as a fracturing fluid into a wellbore, and a process of increasing the viscosity of the fracturing fluid using subterranean heat and forming a fracture in a subterranean formation by hydraulic fracturing is provided.

Specifically, in a well drilled in the vertical direction and/or the horizontal direction from the ground surface to the reservoir, the downhole wall of the productive layer is perforated by explosives and the like. Then, the well-treatment fluid containing proppants and the non-ionic polyamino acid derivative according to an embodiment of the present invention is injected into the wellbore as the fracturing fluid. The well-treatment fluid has a low viscosity on the ground surface. The well-treatment fluid is heated by subterranean heat until the fluid reaches a target reservoir, and thereby thickens sufficient to form a fracture. The fracture can be formed in the reservoir formation by applying pressure to the well-treatment fluid having an increased viscosity by elevated temperature near the reservoir. The fracture can be efficiently formed at the desired intervals in the longitudinal length by sequentially repeating the same operations from the end of the downhole.

Method for Isolating Wellbore

In one aspect of the present invention, a method for isolating a wellbore, the method including a process of injecting the well-treatment fluid as a temporary diverting agent into a wellbore, and a process of increasing the fluid viscosity with the temporary diverting agent using subterranean heat and isolating the wellbore is provided.

As a specific application method, the well-treatment fluid containing the non-ionic polyamino acid derivative of an embodiment of the present invention is injected into the downhole as a temporary diverting agent to refracture the downhole producing hydrocarbon resources. The well-treatment fluid has a low viscosity at the ground and the ground surface. The well-treatment fluid is heated by subterranean heat until the fluid reaches a target reservoir, which causes the well-treatment fluid to thicken sufficient to plug an existing fracture and to gel. After temporarily plugging and isolating the existing fracture with this high viscosity gel, perforation and fracturing treatment are performed for a target location, and thereby a new fracture can be formed. The high viscosity gel remaining in the isolated locations degrades and disperses over time at high temperatures of subterranean heat. Alternatively, the high viscosity gel can be flowed back easily by delivering a cooling fluid such water cooling a temperature lower than the gelling temperature, and reducing the viscosity again. In addition to the above applications, the well-treatment fluid according to an embodiment of the present invention is preferably used, for example, in the case of temporally interrupting oil production for repairing facilities in the downhole or on the ground.

INDUSTRIAL APPLICABILITY

The well-treatment fluid of an embodiment of the present invention may be preferably used for, for example, a well-treatment fluid such as a fracturing fluid for forming a fracture in hydraulic fracturing and a temporary diverting agent for plugging and temporarily isolating an existing fracture before a refracturing process.

The invention claimed is:
1. A well-treatment fluid comprising:
a non-ionic polyamino acid derivative; the non-ionic polyamino acid derivative including:
an α-type or β-type polyaspartic acid monomer unit represented by Formula (I):

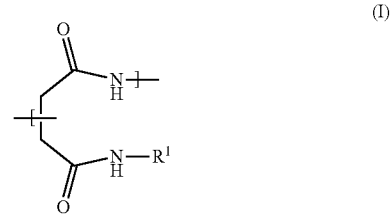

wherein $R^1$ is a hydrocarbon group having from 3 to 18 carbons; and an α-type or β-type polyaspartic acid monomer unit represented by Formula (II):

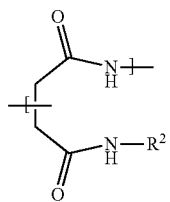

(II)

wherein R² is a group selected from the group consisting of a hydroxymethyl group, a hydroxyethyl group, a hydroxypropyl group, a hydroxybutyl group, a hydroxypentyl group, a hydroxyethoxyethyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, an N,N-dimethylaminopropyl group, and an N,N-diethylaminopropyl group, and wherein the well-treatment fluid is a fracturing fluid.

2. A method for forming a fracture, the method comprising:

injecting a fracturing fluid in a wellbore and forming a fracture in a subterranean formation by hydraulic fracturing;

wherein said fracturing fluid comprises a non-ionic polyamino acid derivative;

wherein the non-ionic polyamino acid derivative includes:

an α-type or β-type polyaspartic acid monomer unit represented by Formula (I):

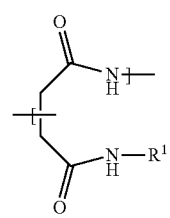

(I)

wherein R¹ is a hydrocarbon group having from 3 to 18 carbons; and an α-type or β-type polyaspartic acid monomer unit represented by Formula (II):

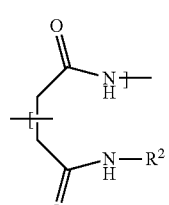

(II)

wherein R² is a group selected from the group consisting of a hydroxymethyl group, a hydroxyethyl group, a hydroxypropyl group, a hydroxybutyl group, a hydroxypentyl group, a hydroxyethoxyethyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, an N,N-dimethylaminopropyl group, and an N,N-diethylaminopropyl group.

3. A method for isolating a wellbore, the method comprising:

injecting a well treatment fluid as a temporary diverting agent in a wellbore; and isolating said wellbore with said well treatment fluid;

wherein said well treatment fluid comprises a non-ionic polyamino acid derivative;

wherein the non-ionic polyamino acid derivative includes:

an α-type or β-type polyaspartic acid monomer unit represented by Formula (I):

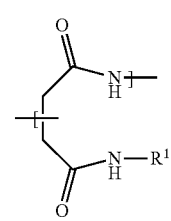

(I)

wherein R¹ is a hydrocarbon group having from 3 to 18 carbons; and an α-type or β-type polyaspartic acid monomer unit represented by Formula (II):

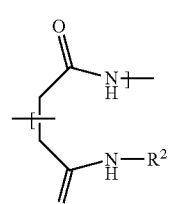

(II)

wherein R² is a group selected from the group consisting of a hydroxymethyl group, a hydroxyethyl group, a hydroxypropyl group, a hydroxybutyl group, a hydroxypentyl group, a hydroxyethoxyethyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, an N,N-dimethylaminopropyl group, and an N,N-diethylaminopropyl group.

* * * * *